(12) United States Patent
Friedman et al.

(10) Patent No.: US 8,758,898 B2
(45) Date of Patent: Jun. 24, 2014

(54) THERMOPLASTIC MULTILAYER INTERLAYER POLYMER FILM AND RELATED GLASS LAMINATE COMPOSITE INCLUDING SAME

(75) Inventors: Michael L. Friedman, New York, NY (US); Barbara JoAnne Lang, Palo Alto, CA (US); Boris M. Friedman, Hoboken, NJ (US); Al Ansari, Los Altos, CA (US)

(73) Assignee: Liveglass, Inc., Palo Alto, CA (US)

( * ) Notice: Subject to any disclaimer, the term of this patent is extended or adjusted under 35 U.S.C. 154(b) by 188 days.

(21) Appl. No.: 13/250,235

(22) Filed: Sep. 30, 2011

(65) Prior Publication Data

US 2012/0088082 A1 Apr. 12, 2012

Related U.S. Application Data

(60) Provisional application No. 61/391,849, filed on Oct. 11, 2010, provisional application No. 61/394,118, filed on Oct. 18, 2010.

(51) Int. Cl.
*B32B 7/02* (2006.01)
*B32B 17/10* (2006.01)
*B32B 27/00* (2006.01)
*B29C 65/00* (2006.01)

(52) U.S. Cl.
USPC .......... 428/423.1; 428/213; 428/339; 156/60; 156/285

(58) Field of Classification Search
None
See application file for complete search history.

(56) References Cited

U.S. PATENT DOCUMENTS

| | | | |
|---|---|---|---|
| 4,619,973 A | 10/1986 | Smith, Jr. | |
| 4,663,228 A | 5/1987 | Bolton et al. | |
| 5,002,820 A | 3/1991 | Bolton et al. | |
| 5,763,062 A | 6/1998 | Smith et al. | |
| 5,895,721 A | 4/1999 | Naoumenko et al. | |
| 6,423,170 B1 | 7/2002 | Friedman et al. | |
| 6,432,522 B1 | 8/2002 | Friedman et al. | |
| 6,479,155 B1 | 11/2002 | Gelderie et al. | |
| 6,652,943 B2 | 11/2003 | Tukachinsky et al. | |
| 6,720,082 B1 | 4/2004 | Hashimoto et al. | |
| 6,998,007 B2 | 2/2006 | Tukachinsky et al. | |
| 7,291,398 B2 | 11/2007 | Anderson | |
| 7,641,965 B1 | 1/2010 | Bennison et al. | |
| 7,678,441 B2 | 3/2010 | Smith | |
| 7,754,338 B2 | 7/2010 | Anderson | |
| 2004/0241479 A1 | 12/2004 | Domine et al. | |
| 2005/0196625 A1 | 9/2005 | Toyama et al. | |
| 2007/0122629 A1* | 5/2007 | Chen et al. | 428/423.1 |
| 2010/0062236 A1 | 3/2010 | Bennison et al. | |

FOREIGN PATENT DOCUMENTS

| | | |
|---|---|---|
| JP | 4234643 A | 8/1992 |
| KR | 20090096194 A | 9/2009 |

OTHER PUBLICATIONS

Dupont TM Sentry Glas R, A More Structural Glass Interlayer: Dupont TM Sentry Glas R, http://www2.dupont.com/SafetyGlass/en_US/products/sentryglas.html.

* cited by examiner

*Primary Examiner* — Sheeba Ahmed
(74) *Attorney, Agent, or Firm* — George R. McGuire; Bond Schoeneck & King, PLLC

(57) ABSTRACT

A multilayer interlayer polymer film and a high clarity safety glass laminate made using the same include: (1) a core layer comprising one of an ionomer polymer material and a thermoplastic polyurethane polymer material; (2) at least one intermediate layer laminated to the core layer and comprising the other of the ionomer polymer material and the thermoplastic polyurethane polymer material; and (3) at least one skin layer laminated to the at least one intermediate layer and comprising a non-ionomer polyolefin polymer material. The multilayer interlayer polymer film provides the high clarity safety glass laminate with enhanced performance with respect to optical properties and manufacturability. In an alternative embodiment the at least one skin layer may be omitted when the intermediate layer comprises a thermoplastic polyurethane material with adequate adhesion to glass.

21 Claims, 1 Drawing Sheet

THERMOPLASTIC MULTILAYER INTERLAYER POLYMER FILM AND RELATED GLASS LAMINATE COMPOSITE INCLUDING SAME

CROSS-REFERENCE TO RELATED APPLICATIONS

This application claims priority to U.S. Provisional Patent Application Ser. No. 61/391,849, filed Oct. 11, 2010; and (2) U.S. Provisional Patent Application Ser. No. 61/394,118, filed Oct. 18, 2010, each titled "Thermoplastic Interlayer Film and Transparent Mechanical and Acoustical Barrier," the entirety of which is hereby incorporated by reference herein.

BACKGROUND

1. Field of the Invention

Embodiments relate generally to interlayer film constructions that may be incorporated into related glass laminate composite constructions. More particularly, embodiments relate to impact resistant interlayer film constructions that may be incorporated into related impact resistant glass laminate composite constructions.

2. Description of the Related Art

Safety glass glazing products and barrier glass glazing products (i.e., impact resistant glazing products) are glazing products that find a wide range of applications in a plurality of industries. Such glazing products are often conventionally fabricated to include an interlayer film comprising a polyvinylbutyral (PVB) polymer material interposed between a pair of glass panes. The polyvinylbutyral polymer material generally exhibits very high optical clarity, and when the polyvinylbutyral polymer material is plasticized to provide a desirable high impact resistance, the polyvinylbutyral polymer material also typically exhibits enhanced adhesion to each of the pair of glass panes.

While an interlayer film that comprises a polyvinylbutyral polymer material for an impact resistant glazing product has been available for many decades, an interlayer film that comprises a polyvinylbutyral polymer material for an impact resistant glazing product is nonetheless not entirely without problems. In that regard, impact resistant glass composite glazing products that include a polyvinylbutyral polymer material within an interlayer film are often subject to plasticizer bloom that may cause for hazing and delamination of the impact resistant glass composite glazing products. As well, polyvinylbutyral polymer materials are often prone to moisture absorption, and for that reason a need may arise for an environmentally controlled fabrication facility when fabricating an impact resistant glazing product that comprises an interlayer film that comprises a polyvinylbutyral polymer material. Finally, given a comparatively high density of a polyvinylbutyral polymer material in comparison with other polymer materials, glazing products that comprise an interlayer film that comprises a polyvinylbutyral polymer material may have a comparatively higher cost.

Given that needs for impact resistant glazing products are likely to continue to increase, desirable are enhanced performance cost effective impact resistant glazing products and methods for fabricating the enhanced performance cost effective impact resistant glazing products.

SUMMARY

Embodiments include a multilayer interlayer polymer film that may be used in fabricating an impact resistant glazing product and a glass composite construction that includes the multilayer interlayer polymer film. The multilayer interlayer polymer film includes: (1) a core layer comprising one of a thermoplastic polyurethane (TPU) polymer material and an ionomer polymer material; (2) at least one intermediate layer laminated to the core layer and comprising the other of the thermoplastic polyurethane polymer material and the ionomer polymer material; and (3) at least one skin layer laminated to the at least one intermediate layer and comprising a non-ionomer olefin polymer material.

The embodiments also include a particular multilayer interlayer polymer film that includes a core layer comprising an ionomer polymer material and at least one intermediate layer laminated to the core layer and comprising a thermoplastic polyurethane polymer material that also has adequate adhesion to glass to preclude a need for a skin layer comprising a non-ionomer olefin polymer material laminated to the intermediate layer.

Within the embodiments: (1) the non-ionomer olefin polymer material serves as a bonding material to glass; (2) the ionomer polymer material provides for toughness and strength; and (3) the thermoplastic polyurethane material provides a resilient elastic impact barrier (under certain circumstances with high adhesion to glass and to other polymers). Optionally, a linear low density polyethylene (LLDPE) polymer material layer (i.e., another non-ionomer olefin polymer material) may be located and formed as an inner lying additional skin layer interposed between the skin layer and the and the intermediate layer.

A multilayer interlayer polymer film or a related glass laminate composite in accordance with the embodiments does not include a polyvinylbutyral polymer material, and also does not include any plasticizer materials.

Specific symmetric (with respect to the core layer) structures of different embodiments of glass laminate multilayer interlayer polymer film structures in accordance with the embodiments include:

Version 1: Glass/TPU/Ionomer/TPU/Glass;
Version 2: Glass/EVA/(LLDPE)/Ionomer/TPU/Ionomer/(LLDPE)/EVA/Glass; and
Version 3: Glass/EVA/(LLDPE)/TPU/Ionomer/TPU/(LLDPE)/EVA/Glass.

A particular multilayer polymer film in accordance with the embodiments includes a core layer comprising an ionomer polymer material. The particular multilayer polymer film in accordance with the embodiments also includes at least one intermediate layer laminated to the core layer and comprising a thermoplastic polyurethane polymer material.

Another particular multilayer polymer film in accordance with the embodiments includes a core layer comprising one of a thermoplastic polyurethane polymer material and an ionomer polymer material. This particular multilayer polymer film in accordance with the embodiments also includes at least one intermediate layer laminated to the core layer and comprising the other of the thermoplastic polyurethane polymer material and the ionomer polymer material. This particular multilayer polymer film in accordance with the embodiments also includes at least one skin layer laminated to the at least one intermediate layer and comprising a non-ionomer polyolefin polymer material.

A particular laminated glass composite construction in accordance with the embodiments includes a multilayer polymer film located interposed between a first glass layer and a second glass layer. The multilayer polymer film includes a core layer comprising one of a thermoplastic polyurethane polymer material and an ionomer polymer material. The multilayer polymer film also includes at least one intermediate layer laminated to the core layer and comprising the other of the thermoplastic polyurethane polymer material and the ionomer polymer material. The multilayer polymer film also includes at least one skin layer laminated to the at least one intermediate layer and comprising a non-ionomer polyolefin polymer material.

A particular method for fabricating a multilayer polymer film in accordance with the embodiments includes assembling a stack comprising a first glass layer and a second glass layer having interposed there between: (1) a core layer comprising one of a thermoplastic polyurethane polymer material and an ionomer polymer material; (2) at least one intermediate layer adjacent the core layer and comprising the other of the thermoplastic polyurethane polymer material and the ionomer polymer material; and (3) at least one skin layer located over the at least one intermediate layer and comprising a non-ionomer polyolefin polymer material. The particular method also includes treating the stack to form a laminated glass composite construction.

BRIEF DESCRIPTION OF THE DRAWINGS

The objects, features and advantages of the embodiments are understood within the context of the Detailed Description of the Embodiments, as set forth below. The Detailed Description of the Embodiments is understood within the context of the accompanying drawings, that form a material part of this disclosure, wherein.

DETAILED DESCRIPTION OF THE EMBODIMENTS

Embodiments include a multilayer interlayer polymer film that may be used within a related laminated glass composite construction also in accordance with the embodiments, and a method for fabricating the laminated glass composite construction. In accordance with the embodiments, the multilayer interlayer polymer film comprises a core layer comprising one of a thermoplastic polyurethane material and an ionomer polymer material. The multilayer interlayer polymer film also comprises at least one intermediate layer laminated to the core layer and comprising the other of the thermoplastic polyurethane polymer material and the ionomer polymer material. The multilayer interlayer polymer film also comprises at least one skin layer laminated to the at least one intermediate layer and comprising a non-ionomer polyolefin polymer material.

Figure 1:
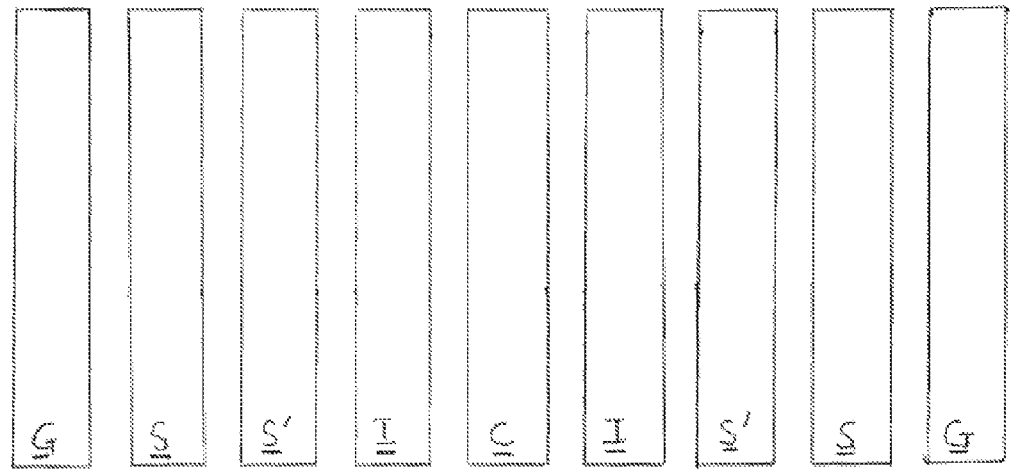
FIG. 1 and FIG. 2 show a plurality of schematic cross-sectional diagrams illustrating the results of progressive process stages in fabricating a glass composite construction comprising a multilayer interlayer polymer film in accordance with the embodiments.
Figure 2:
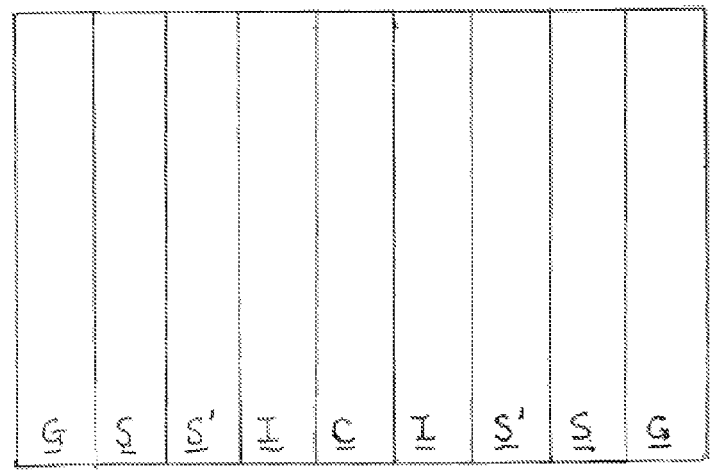

Particular component layers within a laminated glass composite construction comprising a multilayer interlayer polymer film construction are illustrated in FIG. 1 (i.e., prior to complete lamination) and FIG. 2 (i.e., subsequent to complete lamination). Within FIG. 1 and FIG. 2, G represents a glass layer, S represents a skin layer, S' represents an optional additional skin layer, I represents an intermediate layer and C represents a core layer. Typically and preferably, each of the glass layers G has a thickness from about 1 mm to about 10 mm and each of the remaining skin layer S, optional additional skin layer S', intermediate layer I and core layer C has a thickness from about 0.1 mil to about 60 mil, as discussed in further detail below.

Within the context of the embodiments, a "glass" pane or substrate is intended as a sheet of rigid transparent material comprising mineral glass or rigid plastic, and forming the outer faces of a transparent, impact resistant mechanical and acoustic barrier glazing. Mineral glass, (i.e. soda-lime-silicate glass) gives superior mechanical and acoustical barrier properties in comparison with rigid plastic. Mineral glass, polycarbonate, polyacrylate and cyclic polyolefins (e.g. ethylene-norbornene copolymer and metallocene-catalyzed polystyrene) and combinations thereof, are useful in the outer faces of a mechanical and acoustic barrier glazing product within the context of the embodiments. Thus, each of a first glass layer and a second glass layer within a glass laminated interlayer polymer film in accordance with the embodiments may be selected from the group including but not limited to crystallized glass, soda glass, borosilicate glass, keraglass, other mineral glass materials, polycarbonates, acrylics, and other transparent polymer glass-type materials.

Within the embodiments, a "multilayer film" an "interlayer film" or a "multilayer interlayer polymer film" (or related terminology) is intended as a laminated sheet/film material of several constructions. In one embodiment, the laminated film material comprises at least one rigid "core" film layer C and at least two "intermediate" I and two surface "skin" (or soft) S film layers, has an SICIS construction, and is sandwiched between two glass panes to make a transparent optical laminate having impact resistance, mechanical and sound barrier properties. An SICIS' construction having at least two different types of surface "skin" film compositions may also be used. In an alternative embodiment, the multilayer film comprises at least one surface film layer and one rigid core film layer in a SC construction. In another alternative embodiment the multilayer film comprises at least one soft "skin" film layer S and at least two rigid "core" film layers C and has a CSC-type structure.

Within the context of the embodiments, a "skin layer" is intended as an outer film typically on both sides of the multilayer film structure, which contacts the glass panes (from the inside of the glass laminate). The "skin" layer can be preliminary coextruded with intermediate or core film layers, or can be stacked together with individual film webs in one package and then used in the glass-polymer lamination process. Ethylenevinylacetate (EVA) is preferred as a "skin" film due to its satisfactory adhesion to glass and other polymer materials, and due to high quality ethylenevinylacetate optical properties such as high clarity and low haze. Suitable ethylenevinylacetate resin for optical laminate interlayer films may be obtained from several vendors, for example from: (1) Bridgestone Corporation, Tokyo, Japan; (2) Exxon-Mobil Corporation, Baytown, Tex.; and from (3) Specialized Technologies Resources, Inc., Enfield, Conn.

Within the context of the embodiments, an "intermediate layer" is a layer of film located and formed interposed between a "skin" layer and a "core" layer in a symmetrical or non-symmetrical disposition. The intermediate layer has several functions, including adhesion between adjacent layers ("tie" layer), cost reduction and increase of impact resistance of the multilayer interlayer and the resulting glass laminate composite.

Within the context of the embodiments, a "core layer" is a layer of penetration resistant, rigid polymeric material formed by film casting, film/sheet extrusion or injection molding. The core layer preferably comprises one of two main types of polymer resins, namely ionomer resins and thermoplastic polyurethane resins. Ionomer resins typically include a copolymer such as copolymer of carboxylic acid or of acrylate ester with ethylene or other reactive co-monomer (e.g. those available from E.I. duPont DeNemours and Company, Wilmington, Del. as Surlyn™ 8140, 8150 or 8940 resins), and the acid groups are partially neutralized with either zinc or sodium ions. As used herein, an ionomer resin refers to a copolymer of acrylate monomers with any reactive co-monomer, including, but not limited to comonomers that yield copolymers disclosed for example in U.S. Pat. Nos. 5,763,062 and 4,663,228, the contents of which are hereby incorporated by reference. The thickness of a first ionomer core layer is chosen to pass (in combination with a second core layer made of a thermoplastic polyurethane resin) the impact tests described below, and to meet and exceed the standards. In addition to the DuPont ionomer polymer materials described above, suitable ionomer polymer materials for use as a component in the core layer, include ionomer polymer resin films of Iotek™ ionomer material (copolymer of carboxylic acids) obtained from Exxon-Mobil Corporation and IMAC™ ionomer polymer available from Chevron Corporation. The ionomer resin may be cross-linked and/or mixed with additives as desired. Ionomers have a low density (0.93-0.97 g/ccm), excellent processability, and very low haze.

Preferred grades of ionomer polymer resins in the current disclosure are materials with molecular weight corresponding to a melt flow rate (MFR) in a range from 1.0 g/10 min. to 10 g/10 min, and preferably from 1.5 g/10 min. to 7 g/10 min., and most preferably from 2.0 g/10 min. to 5.0 g/10 min. suitable for film extrusion and co-extrusion with high output and yield, as well as fabrication of thin film, such as Surlyn™ 8150 with MFR=4.5 g/10 min. and Surlyn™ 8940 with MFR=2.8 g/min. In addition to the flowability of resin suitable for extrusion and co-extrusion of a thin film, preference is given to a resin combining the optimal molecular weight (corresponding to the above MFR parameters) with lowest possible haze. The grades 8140, 8150, and 8940 show extremely low haze, for example 8150 has only 1.3% haze measured for sheets 100 mil (2.5 mm) thick, i.e. proportionally ~0.5% and even lower for film 40 mil thick (this thickness is considered as a most "representative" for comparison to standard PVB interlayer). Ionomeric polymer 8940 has a higher molecular weight and respectively a lower MFR (2.8 g/10 min.). This grade provides the haze on a level close to 5% for sheets 100 mil thick, and respectively <2% for 40 mil thick films.

Experiments show that incorporation of nucleating agents and/or particles of nanoclay (less than 1 wt. %, typically 0.5 wt. %) allows reduction of haze by at least half, and possibly more.

The other core layer material, thermoplastic polyurethane, in form of an aliphatic optical quality film is available from several sources, including Dow Chemical Company, Huntsman Corporation, Argotec, Inc., BASF and others. Chemically thermoplastic polyurethane is an aromatic or aliphatic polyester having a unique combination of special properties, very suitable for the goals of the current disclosure. These properties include high mechanical strength, very high elongation at break (350-800%), impact resistance on a level approaching rubber, excellent adhesion to many polymers, glass and other materials, and very low glass transition temperature (for some grades up to minus 67 F or minus 55 C). Density of thermoplastic polyurethane is close to polyvinylbutyral (1.06-1.10 g/ccm).

The typical thermoplastic polyurethane film with thickness in the range from 10 mil to 100 mil is not a high clarity material. For this reason, and for the purpose of the disclosed embodiments, the preferred thermoplastic polyurethane film has a thickness in the range from 0.5 mil to 10 mil, preferred from 1 mil to 6 mil, and most preferred from 1.0 mil to 5 mil. A thicker thermoplastic polyurethane material layer increases the haze values of the interlayer, and a thermoplastic polyurethane core layer of lower thickness does not provide the sharp increase in impact resistance of the multilayer interlayer film and the glass laminate composite respectively.

Some sources may provide much thinner thermoplastic polyurethane films, from 0.2 mil and somewhat thicker. It may be considered that thermoplastic polyurethane is a high-performance material with properties superior to polyvinylbutyral and other plasticized vinyl film and even some elastomers and thermoset rubber (TR). It contains no plasticizers to leach ("bloom") and does not cause brittleness over time. Thermoplastic polyurethane also has an outstanding shelf-life, very high UV light resistance as well as resistance to ozone, bacteria, fungus, and oils. The optimal high-performance core layer according to current disclosure is a combination of high toughness and clear ionomer with very high impact resistant and clear "soft" thermoplastic polyurethane.

Resins suitable for use either in all (skin, intermediate, and core) layers when tested at a film thickness of about 0.5 mm and up to 5 mil must yield a maximum haze value of 4% as measured by ASTM D 1 003-95. For most glazing applications a maximum haze value of 2%, and preferably 1%, is required at the total thickness of 1.4 mm (56 mil). Using film layers of lesser thickness and some additives incorporated into the polymer resins of the layers, the haze values can be lowered significantly (see examples below), and for interlayer film 40 mil thick the haze of 0.25-0.50% and lower may be achieved, which is comparable to a polyvinylbutyral interlayer.

Preferred film formulations in accordance with the embodiments contain additive packages. As a coupling agent (to improve adhesion between the interlayer and glass without primer coating) may be used vinyltriethoxysilane, aminopropyltriethoxysilane and others. A number of UV-light absorbers known in the industry may be added to block UV-light. Among them are the following effective additives: Chemosorb Inuvik™ 944 (from Ciba Geigy Corp., Switzerland-Germany), Cyasorb™ UV-9 (American Cyanamid (Basel, Switzerland), and polymerizable benzotriazole Norblock™ (Noramko Corp., USA). UV-light absorbers are used in concentration from 0.1% (wt.) to 1.5%, preferably from 0.5% to about 1.5%, and most preferably from 0.75% to 1.5%.

Other additives may be used to achieve special properties. For example additives are available to reduce IR-light transmittance and to increase reflection. Liquid elastomers, such as isoprene-butadiene-isoprene resin available from Exxon-Mobil, and elastomeric PP (EHPP) may be added to the ionomeric resin for impact modification and as a processing aid.

Generally, the embodiments provide a multilayer interlayer polymer film and high clarity glass-polymer laminate made using it, wherein the glass-polymer laminate comprises at least two glass sheets (panes) and one sheet of multilayer interlayer film in a glass/interlayer film/glass sandwich, and where the multilayer interlayer film is based on combination of individual layers of "skin," "intermediate" and "core" layer. The "skin" film layer is made of non-ionomer polyolefin-type polymer chosen from the group including but not limited to ethylenevinylacetate (EVA) (for improved adhesion to glass, clarity, low density and cost reduction), linear low density and low crystallinity polyethylene (PE), and elastomeric polypropylene (EHPP). The "intermediate" layer is made of an ionomer polymer material for toughness, clarity and acoustical barrier properties, another intermediate and/or "core" layer made of non halogen, aromatic polyether-based "soft" thermoplastic polyurethane (TPU) with low density (1.09~1.13 g/cm3) and low mechanical modulus, high flexibility and clarity for increased resilience, impact resistance and mechanical barrier properties towards impact at high speed deformations, wherein the materials of the "intermediate" and "core" layers may be interchangeable in various structures (i.e., the "intermediate" layer can be made of "soft" TPU and the "core" layer of ionomer, and vice versa). There are several preferred structures of the multilayer interlayer film depending on potential applications. For example a simple safety glass can use a multilayer interlayer designed as: EVA-TPU-Ionomer-TPU-EVA. For better impact resistance the laminate can be made as: EVA-LLDPE-TPU-Ionomer-TPU-LLDPE-EVA. The toughest glass (hurricane resistant glazing) can be made with TPU core layer encapsulated between two ionomer layers as follows: EVA-Ionomer-TPU-Ionomer-EVA, etc. Various combinations of layers of different thicknesses can be fabricated, but according to current disclosure the "soft" TPU-Ionomer components are mandatory to achieve high impact resistance of the glass laminate along with high quality optical properties. This multilayer interlayer film (sheet) is placed between two glass panes and heat and/or vacuum laminated into one multilayer interlayer glass-polymer film structure. Thickness of all components can vary in a wide range, as will be described in the disclosure.

The embodiments also contemplate a multilayer interlayer film and glass laminate wherein the individual components are chosen with certain limited chemical (molecular) and structural parameters, providing optimal performance parameters of the film and glass-polymer laminates. For example it is expected that the highest clarity in combination with highest impact resistance in ball drop tests of the glass laminate structure is achieved if an EVA skin layer is made of resin with the content of VA groups in the copolymer chains in the range from 6% to 21%, preferably from 8% to 18%, and most preferably from 10% to 16%. "Soft" TPU "intermediate" or "core" layers should be made of TPU resin with mechanical modulus at 300% elongation (measured as described in ISO527-2/1 A/1) of 3.5 MPa to 17,000 MPa, preferably from 5.0 MPa to 2,000 MPa, and most preferably from 8.5 MPa to 1,500 MPa. For better clarity, toughness, and good processability the ionomer "intermediate" or "core" layer should be fabricated of an ionomeric copolymer with molecular weight (MW) corresponding to melt flow rate in the range from 2 g/10 min. to 15 g/10 min.

The embodiments also contemplate that an EVA film may be cross-linked due to low softening (melting) point and low use temperature of this polymer, which are lower than requirements for most applications, for example in glazing for commercial and residential buildings. Cross-linking of EVA is done using standard peroxide-silanol technology described in numerous articles and patent literature (see for example Adi Yeganegi, "Manufacturing of Silane Cross-linked Polyethylene Resin," Report of Synergic Industries, Inc., Vancouver, Canada, February 2000, p. 1-18).

The embodiments also contemplate that the ionomer "intermediate" component layer comprises an ionomer polymer with molecular weight corresponding to the MFR in the range from 1.0 g/10 min to 15 g/10 min., preferably from 2.0 g/10 min. to 10 g/10 min. and most preferably from 3.0 g/10 min. to 7.0 g/10 min.

The embodiments also contemplate that the TPU layer comprises a TPU polymer material with MFR from 2 g/10 min. to 20 g/10 min., preferably from 3.5 g/10 min. to 15 g/10 min. and most preferably from 4 g/10 min to 10 g/10 min.

The embodiments also contemplate that an optimal ratio of the thickness of the layers has been investigated and determined both theoretically and experimentally. It is determined that the highest impact resistance of the glass laminate is achieved when the thickness ratio of the EVA-ionomer-TPU layers is within the range from 1:3:6 to 2:4:4.

The embodiments also contemplate that an optimal thickness of TPU layer in terms of combination of impact resistance and optical properties (low haze) of the glass-polymer laminate is in the range from 0.1 mil to 10 mil, preferably from 0.25 mil to or 6 mil, and most preferably from 0.5 mil to 5 mil. A TPU multilayer interlayer component layer of lower thickness does not improve the impact properties of the multilayer interlayer glass laminate to the desired level, and a TPU layer of larger thickness creates increased haze unacceptable in most glazing applications.

The embodiments also contemplate that polymeric materials that may be used for making the multilayer interlayer film and its components may preferably contain an additive package, which may include various functional components. The type and content of functional components depend on the type and application of the glazing laminate to be produced. Coupling agents may be added to improve adhesion of the polymeric multilayer interlayer to glass and other substrates without primer coating of the glass or other substrates. A UV-light absorber may be added to block UV-light and to provide protection from the negative influence of transmission of UV-light. Among other additives are nucleation agents that are intended to improve optical properties and clarity, and to reduce haze of the film, and to stabilize the morphological structure of the material. Pigments, dyes, and/or color concentrates may be added in the safety glass or plastic laminate when special color effects as may be needed for architectural, decorative and other applications.

The embodiments also contemplate that a multilayer interlayer film and all or some of its components may contain "super small" mineral particles (nano-particulates such as nanoclay, etc.) to improve the optical and mechanical properties of multilayer interlayer film, thus influencing positively the impact resistance, stiffness, and modulus of multilayer interlayer film structure. The content of nano-particles is in the range from 0.1% to 10% by weight.

EXPERIMENTAL

The technology and equipment used to fabricate samples of glass-multilayer interlayer polymer laminates used a "vacuum bag." In each trial a multilayer film stack was placed between two glass panes and positioned in a vacuum station ("vacuum bag"), where it was subjected simultaneously to heating and vacuum "pressure" processing.

1. Equipment

The working set of equipment included the following main units: (1) two heated plates; (2) a vacuum system; and (3) a vacuum "bag." The plates were 230 mm×230 mm×25 mm in dimensions (9.2"×9.2"×1"), made of aluminum and equipped with flat silicone heating devices and thermocouples. The bottom plate was positioned stationary upon support "legs" 60 mm (2.4") high, and the upper plate was removable. Each plate had an independent heating control system installed with a high precision thermal controller (+/−0.5 degree C.).

The vacuum system included a pre-vacuum pump, three-way flow directing unit, vacuum-meter, and a set of tubing. The vacuum bag was made of silicone sheets 1 mm (40 mil) thick and dimensions 500 mm×500 mm (20"×20"), positioned opposite each other into a multilayer bag. The upper sheet/layer had an inlet for connecting vacuum tubing, and the bottom layer (between the inlet and the corner of the "sandwich" to be laminated) had an installed mesh and/or tubing, which provided vacuum to the laminated structure. Without such a unit the vacuum would cause the collapse of the bag and prevent the vacuum from reaching the lamination zone. The layers of the bag were glued together at three sides by applying silicone glue. The bag remained free (loose) at the fourth side.

2. Method

The working plates were pre-heated to a chosen temperature. The experimental glass-film structure was positioned in the middle of the vacuum bag cavity, and the open (loose) side of the bag was sealed by tape. The tubing line of the vacuum system was connected to the inlet of the vacuum bag. Then the vacuum pump was switched on, and the vacuum reached a value close to 1 atm. The vacuum bag was positioned between the pre-heated working plates, and the bag was heated for approximately 10 minutes under vacuum.

After these actions the bag was removed from the plates and cooled to the ambient temperature. After this operation the system was disassembled and the glass-plastic laminate was recovered from the system. All samples were subjected to tests of various properties as described below.

3. General Considerations for Fabricating Multilayer Interlayer Polymer Films and Related Glass Composites All film components for the desired multilayer interlayer polymer films can be fabricated using different technologies. Some of multilayer interlayer film components may be co-extruded out of polymer pellets, and in other cases they can be "assembled" in appropriate packages ("stacks" or "sandwiches") using film layers pre-extruded, or acquired from many different sources. These techniques and suggested vendors are described in greater detail within the embodiments. Consideration should be given to secure films and laminates of good quality, which meet tough requirements for various glazing products. Particular procedural considerations for processing different polymer materials are briefly described below.

A. Pre-Drying of Polymer Pellets and Films

Absorption of moisture from air and other sources when fabricating multilayer interlayer polymer films should be avoided even if starting material polymers are not very hygroscopic. Typical examples and recommendations are given below for the main polymer material components of a multilayer interlayer polymer film in accordance with the embodiments.

Ethylenevinylacetate and other polyolefins do not need any pre-drying due to very limited moisture absorption during storage and transportation. Pre-drying of these particular polymer materials serves more as a pre-heating of pellets before extrusion/co-extrusion for increasing the stability and output of the extrusion process. The pre-heating should be "mild," at temperatures not higher than 50-60 degree C. (~122-140 F) to avoid softening of the pellets surface which might negatively influence an extruder feeding section performance.

Thermoplastic polyurethane has to be pre-dried at a temperature in a range from 115 C to 120 C (~240-250 F). An increase of the temperature leads to very high tackiness of TPU pellets and/or film, and makes the handling of the material in any form very difficult.

Ionomers should be protected from long exposure to the atmosphere since they are hydroscopic. Only inventory sufficient for ~2 hours extrusion should be opened prior to use, and even for a shorter period of time (~1 hour only) during the very hot and humid seasons. Use of the fully compounded ionomer-based materials (with mixed in additives such as UV-absorbers, weathering resistance additives, colorants, flame retardant additives, etc.) is desired, and preferably should be done by a commercial compounding company. Dry blending may be successfully used since ionomer resins readily compound and mix with various additives in relatively large quantities.

Moisture absorption of ionomers is relatively high and depends on many factors including grade of resin, type of cation, ambient temperature, relative humidity, and air flow around the ionomer resin pellets. Another source of moisture is atmospheric condensation on a cold resin. The amount of moisture which can be tolerated in an ionomer resin depends on the extrusion temperature. For example, at a melt temperature of 170 C (338 F) any moisture content less than 2600 ppm or 0.26% will permit extrusion without moisture defects. At the melt temperature 250 C (482 F) only moisture less than 1,250 ppm (0.126%) would be acceptable. Experimental data suggest that moisture content of a film as a function of maximum temperature of a melt that produces approximates a reverse linear function.

At a typical melt temperature of 200 C (392 F) there is a significant tolerance for moisture pick up. It is preferred to pre-dry ionomer pellets using a dehumidified or vacuum tray-type oven at the maximum temperature of 65 C (~149 F) to avoid potential "caking" of pellets. It was observed that 8 hours of drying time is adequate. Resin depth in a tray should be about ~50 mm (2") or less. Drying ovens without dehumidifiers or vacuum units are not preferred. Hopper driers are not recommended since the weight of the resin in the hoper may cause agglomeration of pellets resulting in "bridging" of the material in the hopper's throat. As usual the lower the starting moisture content and the higher the drying temperature, the shorter is the required drying time.

B. Extrusion of Interlayer Components, EVA and other Polyolefins

Extrusion of EVA is very similar to standard polyolefins (for instance, LLDPE) in terms of equipment and processing conditions, and does not require any special technologies in comparison with PE. Extrusion of elastomeric hemiisotactic PP (EHPP), available for example from "Equistar" (Cincinnati, Ohio), can be conducted in a blown film and/or cast film processes typical for standard film grades of PP and vinyl-type thermoplastics. Grades of EHPP with mechanical modulus in the range from 1.5 MPa to 8.0 MPa are preferred.

Aliphatic polyether TPU, for example Argobond™ grade by Argotec Inc. (Greenfield, Mass.), possesses a combination of properties superior to plasticized films and thermoset rubber. It contains no plasticizers to leach out and to cause embrittlement of the polymer material over time. In addition, TPU has an outstanding shelf life, and many advantages for window market such as very high clarity in relatively thick layers, exceptional bondability to other polymers/plastics and glass, as well as very high impact resistance, "lay-flat" properties, UV resistance without yellowing in time, impact resistance, waterproof properties, resistance to hydrocarbons, ozone, chemicals, bacteria and fungus. Multi-layer TPU based structures are produced with thickness from 0.2 mil (5 mcm) to 80 mil (2000 mcm, or 2 mm) and width up to 65" (162.5 cm). In many cases of safety glass production it is desirable to secure a pre-extruded TPU film from a supplier specializing in TPU extrusion. Typically, for fabrication of the interlayers according to current disclosure, TPU films in thicknesses between 0.5 mil (12.5 mcm) and 5 mil (125 mcm) are desirable.

Different grades of ionomer resins and films are acceptable for the disclosed embodiments. As examples Surlyn™ by DuPont, grades 8140, 8150, and 8940, may be used. These Surlyn™ grades have melt viscosity suitable for film extrusion at high output and yield. They also have extremely high clarity and low haze. Ionomers produced by Exxon-Mobil under the trade name Iotek™ have comparable properties. Ionomers are relatively easy to extrude due to high melt strength and thermal stability. Ionomers process similarly to PE and EVA. Experience has demonstrated that resin preparation and extruder design specifics are two considerations that have a high priority in processing of ionomers.

Employed within the extrusion apparatus was a typical metering-type screw designed for ionomer thermoplastic resin. Metering-type screws, common for polyolefin, generally perform satisfactory as well with an ionomer resin such as Surlyn™ resin. Screw size of the laboratory extruder used in this disclosure was L/D=25:1 long (most common extruders for ionomer materials have length to diameter ratio (from 20:1 to 28:1), and most modern machines have the L:D ratio even higher (32:1) for higher output and minimal thickness fluctuations of extruded film. The screw has a compression ratio 3.5:1. Other features are considered, such as cooling of the extruder's feeding throat, internal cooling of the screw, and relatively deep channel in the feeding section. All of the foregoing extrusion apparatus features are considered to be preferred for successful ionomer film extrusion.

Melt temperatures for ionomer extrusion into film were in the range from 175 C (~347 F) to 200 C (~392 F) and slightly higher for resin grades with lower MFR. The typical temperature profile (from the feeding section to the extrusion die was (C/F): 150/130-175/347-200/392-230/450. Due to good thermal stability, ionomers allow for an increase of extrusion temperatures up to 260-320 C (500-608 F) if a higher output is desired.

4. Sample Testing Procedures

All fabricated samples were inspected and evaluated by testing measurements of the following properties (parameters):

A first property was adhesion of film components to each other in a multilayer interlayer polymer film, and adhesion of the multilayer interlayer polymer film to glass panes. This property was estimated by boiling each laminate in water for 10 minutes. Samples were considered to pass this test if no delaminating of film layers and/or the interlayer from the glass surfaces occurred.

Optical quality of samples was estimated by measuring first of all the optical haze values of the samples. Haze properties were measured using a standard device (for example Haze-meter BYK by Gardner Corporation) and procedure common in the glass industry according to ISO14782: 1999 (E).

Impact resistance testing of glass laminates was conducted using two main procedures, a ball drop test and a canister bag test. Typically samples 2'×2' (610 mm×610 mm) of glass laminates made using glass panes 3-5 mm thick and interlayer ~15.2 mil (0.38 mm) were used, but smaller samples are also acceptable. Within the context of the embodiments, samples 12"×12" (300 mm×300 mm) of the same glass structures (glass-film-glass) of 5 mm-0.38-5 mm were used. The test procedure is described in detail in GB9962-1999 Standard.

5. Examples and Test Results

In all examples, the laboratory samples of glass-polymer laminates were made using the vacuum bag technology and equipment described above. In all samples of glass laminates a standard mineral silicate window glass 3 mm thick was used (unless the different thickness is indicated). Tests of all samples were conducted as described above. Choice of grades and thicknesses of the multilayer interlayer polymer film components used are given below.

A. Grades and Thickness of EVA

There are several reasons for choosing an optimal thickness of EVA. A thinner EVA film provides higher clarity and lower haze of a skin layer. However, a thinner film is more difficult to process in terms of avoiding wrinkles in a lay-flat position, and in a lamination process, and a thinner film will more readily overheat even after cross-linking. A thicker EVA skin layer film also provides a stronger moisture barrier capability. In addition, in modern glass industry some windows require installation of electrical contacts usually in the skin layer (or skin layer and intermediate layer). Thus, there is a minimum thickness of the skin layer and intermediate layer to enable such an electrical contact. Typically the minimum thickness is greater than about 5-7 mil. A film of this thickness was considered as an optimal choice for the EVA and other possible options of skin layers, or for the combination of the skin layer and intermediate layer according to the embodiments. Experiments have shown that this thickness is still satisfactory for achieving low haze of the multilayer interlayer film. The typical haze values for the EVA-TPU intermediate film components of total thickness of ~5 mil is in the range 0.40-0.80%, and possibly even lower. Addition of nucleation agents enable a reduction of haze up to 0.30-0.40%, which is comparable to PVB.

Content of vinyl-acetate groups (VA content) in the EVA polymer film is a very important structural characteristic of EVA. This parameter influences two main characteristics that dictate the choice of EVA grades, a density of the polymer material and its adhesion to glass. These two characteristics influence the material performance in opposite directions, and for that reason an optimal choice is required. The following correlation exists between the VA content and density: the higher the VA content the higher the density of the material. On the other hand the higher the VA the better adhesion to glass and other polymers due to the strong electrical polarity of VA groups in polymer chains.

Below are listed several film extrusion grades of EVA by Huntsman Corporation to compare VA content and density (source is Huntsman Corporation technical literature) for illustration purposes:

TABLE 1

EVA VA Content and Density

| Grade (number) | VA content % (wt.) | Density g/ccm |
| --- | --- | --- |
| 1201 | 2.0 | 0.926 |
| 1501 | 5.0 | 0.927 |
| 1753 | 7.5 | 0.928 |
| 1903 | 9.0 | 0.929 |
| 11207 | 10.0 | 0.931 |
| 11203 | 12.0 | 0.934 |

The data above illustrate that lower VA content shows the trend towards lower density and respectively higher yield of EVA film per pound of resin. However, the grades above in Table 1 do not have the highest adhesion to glass. Another family of EVA resins may be selected with a possibly lower density at higher VA content for grades with melt flow rate (MFR) appropriate for film extrusion and co-extrusion.

Grades of EVA of various producers have been compared (Huntsman (USA), Equistar (USA), DuPont (USA), Celanese (Switzerland-Germany-USA), Sovilen (Russian Federation), and Seekan Interlayer Technology (China)). All samples of the materials had close densities (0.923-0.924 g/ccm) and MFR but different VA content. The results of adhesion tests are given below in Example 1.

EXAMPLE 1

EVA resins from several vendors were extruded using a laboratory cast film line based on a single-screw extruder (1" screw with L:D=24:1) into a flat film with a nominal thickness of 5 mil. All film samples were used as an interlayer between two 3 mm glass panes and laminated in the vacuum bag unit described above. Adhesion was evaluated for all samples using boiling water immersion procedure. Typically, for adhesion and preliminary environmental durability tests the "boiling" is conducted at 150 F+/−5 F (66 C+/−2 C) for 3 minutes, and then the sample specimens are submerged into boiling water for 10 minutes. A longer time and higher temperature of "boiling" was used to assure that the results were reliable. The results are summarized in the Table 2.

TABLE 2

Adhesion of EVA Films with Various VA Content to Glass

| VA content, % | Boiling time, minutes | Adhesion to glass, description of observations | Evaluation, grade* |
|---|---|---|---|
| 2 | 10 | Delaminating in corners and center | − |
| 4 | 10 | Delaminating in corners and center | − |
| 6 | 10 | No delaminating | + |
| 8 | 10 | No delaminating | + |
| 8 | 30 | Delaminating in two corners | − |
| 9 | 30 | No delaminating | ++ |
| 12 | 30 | No delaminating | ++ |
| 12 | 60 | No delaminating | +++ |
| 16 | 60 | No delaminating | +++ |
| 18 | 60 | No delaminating | +++ |
| 21 | 60 | No delaminating | +++ |

*)Note:
acceptable adhesion is graded with one "+";
good adhesion (preferred) - "++",
strong adhesion (most preferred) - "+++"

Observations from Table 2 indicate that satisfactory adhesion is achieved for a film with a VA content in the range from 6% to 8%, but preferred level ("++") is achieved for 9-12% of VA, and the most preferred ("+++") for EVA with VA content 12-21%, showing a good balance between adhesive and cohesive strength and at relatively low density. Preferred, among others, were EVA film extrusion pellets by Celanese, as resin grades 1615 and 2861 AU, with VA content 16-18%.

B. Grades and Thickness of TPU

TPU film thickness is limited primarily by the clarity of a resulting extruded film, although at a higher TPU layer thickness, a higher impact resistance of a glass laminate can be achieved. Thus, the clarity of a TPU film limits the use of a thick TPU film/sheet. TPU provides highly clear polymer films at relatively low thicknesses, up to about 6 mil (150 mcm). Typically in the industry the threshold of haze value, above which a polymer material is considered unacceptable for glazing products, (except applications where translucent and even opaque materials are acceptable, for example fire walls, special security glass, etc.) is the haze value of 4% and lower at a film thickness of 56 mil (1400 mcm or 1.4 mm). Special additives may reduce this haze to 2%.

EXAMPLE 2

Experiments were undertaken using TPU film of various thicknesses in a lamination process described above. Experiments confirmed that the haze of a TPU film was practically a reverse linear function of the thickness, as illustrated in Table 3. Data in Table 3 were generated using TPU Krystalflex™ PE399.

TABLE 3

Typical TPU Film Haze Values versus Thickness.

| Thickness of TPU Film, Mil (mcm/mm) | Haze (average values), % |
|---|---|
| 38 (950/0.95) | ~4.00 |
| 19 (475/0.47) | ~2.00 |
| 10 (250/0.25) | ~0.95 |
| 5 (125/0.125) | ~0.50 |
| 2.5 (62.5/0.06) | ~0.40 |
| 2.00 (50/0.05) | ~0.35 |
| 1.00 (25.4/~0.025) | ~0.30 |

Thus, if a haze is 4% for a 38 mil film (950 mcm or 0.95 mm) (i.e., which is a typical thickness of a PVB film in safety glass) then the haze of 2% can be achieved for TPU film of ~19 mil (475 mcm or ~0.47 mm) thick, the preferred value of haze 1%—for 9.5 mil (~237 mcm), and the most preferred haze value of 0.5% and lower can be achieved at TPU thickness of ~4.75 (or about 5 mil) mil (~118 mcm).

A TPU film in the range from 0.25 mil to 10 mil can be used for various glazing products according to this disclosure. A range from 0.5 mil to 6 mil is preferred, and the most preferred are TPU films from 0.5 mil to 5 mil.

TPU of all thicknesses show an extremely high adhesion to glass without using any promoters and plasticizers, and excellent impact resistance in a wide temperature range, and high clarity in the thickness range indicated above. As was shown in other experiments, an intermediate layer of TPU of the thickness in the chosen range as a most preferred (0.5 mil to 5.0 mil) provided a desired impact resistance (in ball drop tests) for the glass laminate composite according to the embodiments.

C. Grades and Thicknesses of Ionomer Films

Ionomer films from several vendors can be used as extremely clear and tough resins for the core of the multilayer interlayer film of the glass laminate. Different grades of ionomer materials such as Surlyn™ 8140, 8150, 8940 and others by DuPont and other vendors, having the melt viscosity appropriate for film extrusion, may be used in the disclosure. Surlyn™ may be extruded into a single layer core layer film or can be co-extruded with EVA when the ionomer is selected for the intermediate layer, and the core layer under such circumstances would be made of TPU. In the examples described below, ionomer resins were extruded into single layer film used as core layers. The technology and equipment for ionomer resin preparation and extrusion has been described above.

EXAMPLES 3-5

Ionomer resins Surlyn™ 8140, 8150, and 8940 (chosen due to their very high clarity, high modulus and very good processability) were extruded into 40 mil (1000 mcm, or 1 mm) cast film/sheet 305 mm (12") wide, and after cutting the edges, the film pieces were cut into squares 203 mm×203 mm (8"×8") each. These film samples were used as interlayers for glass laminates with silicate glass (SG). Structures comprising glass-ionomer-glass samples were prepared and tested. Results are shown in the Table 4.

TABLE 4

Properties of Glass-Ionomer-Glass Laminates.

| Example | Structure | Haze values*) | Adhesion quality |
|---|---|---|---|
| 3. | SG-Surlyn™ 8140-SG | 0.55% | Fair (slight delaminating in two corners after boiling) |
| 4. | SG-Surlyn™ 8150-SG | 0.50% | Fair (slight delaminating in one corner after boiling) |
| 5. | SG-Surlyn™ 8940-SG | 0.35% | Satisfactory (slight delaminating in one corner only after manual application of peeling forces) |

From the above data it is observed that an ionomer resin film does not provide strong adhesion to glass. In addition, ionomers with a higher modulus, such as Surlyn™ 8940, showed the highest clarity, lowest haze (~0.35%), highest toughness and rigidity.

EXAMPLES 6-12

The following polymer films were used in the next seven examples of glass-polymer laminate samples: (1) EVA Savilan™ 1615; (2) TPU—High-performance aliphatic polyether-type thermoplastic TPU Krystalflex™ PE399 by Huntsman Corporation, a "soft" TPU with a relatively low modulus; and (3) Ionomeric polymer Surlyn™ by DuPont of two different grades (8150 and 8940).

Laboratory/pilot samples of glass laminates 203 mm×203 mm (8"×8") and 305 mm×305 mm (12"×12") were fabricated of the above glass-polymer components using the vacuum bag technology described in the previous paragraphs. The material combinations and their performance in glass laminates of samples 6-12, are summarized, using typical values in Table 5.

TABLE 5

Properties of Glass Laminates (Examples 6-12)

| ## | Multi-layer Structure of Interlayer | Thickness of components mil (mm) | Adhesion between glass and interlayer | Moisture absorption % wt. | Haze % | Ball drop test |
|---|---|---|---|---|---|---|
| 6. | Ionomer Surlyn™ 8150 | 40 (1) | Not satisfactory, film may be peeled-off in all corners | 0.50 | 0.55 | 4 of 5 specimens failed |
| 7. | Ionomer Surlyn™ 8940 | 40 (1) | Not satisfactory, film may be peeled-off two-three corners | 0.35 | 0.40 | 3 of 5 specimens failed |
| 8. | EVA-Ionomer-EVA (Savilan™ 1615-Surlyn™ 8940-Savilan™) | 7-40-7 (0.175-1-0.175) | Good | 0.15 | 0.55 | 4 of 5 passed |
| 9. | TPU-Ionomer-TPU (Krystalflex™ 399-Surlyn™ 8940-Krystalflex™ 399) | 2.4-36-2.4 (0.06-0.9-0.06) | excellent | 0.40 | 0.50 | 5 of 5 passed |
| 10. | TPU-Ionomer-TPU Krystalflex™ 399-Surlyn™ 8940-Kristalflex™ 399 | 2.4-36-2.4 (0.06-0.9-0.06) | excellent | 0.45 | 0.60 | 5 of 5 Passed |
| 11. | TPU-Ionomer-TPU Krystalflex™ 399-Surlyn™ 8150-Krystalflex™ 399 | 4.8-47-4.8 (0.12-1.2-0.12) | excellent | 0.40 | 0.65 | 5 of 5 passed |
| 12. | EVA-TPU-Ionomer-TPU-EVA Savilan™ 1615-Krystalflex™ 399-Surlyn™ 8940-Krystalflex™ 399-Savilan™ 1615 | (2.0-2.4-36-2.4-2.0) | excellent | 0.25 | 0.35 | 5 of 5 passed |

The above data show that a multilayer interlayer film according to the embodiments has much lower moisture absorption than PVB-based layers, which typical value is in the range from 1.25 wt. % to 2 wt. %, i.e. 5-10 times higher. The lowest moisture absorption in combination with low haze and high impact resistance can be achieved according to the embodiments by combining an EVA skin layer with a TPU intermediate layer encapsulating the ionomer core layer. The interlayer of total thickness around 0.38-0.40 mm (15-16 mils) containing EVA film 2 mil thick, TPU film 2.4 mil and ~30 mil ionomer films should be sufficient for meeting the modern requirements for safety glazing products. The interlayer according to the disclosure has much lower moisture sensitivity than PVB, does not need to contain, and does not contain plasticizers, which in time typically bloom to the surface of the interlayer. The disclosed multilayer interlayer film provides easier lamination and much lower costs of "ownership" since it does not need environmental humidity control for manufacturing, warehousing and transportation.

EXAMPLES 13-17

A set of six different glass laminates (sample 0—based on use of PVB for comparison) of the same combination of interlayer components as in example 12, were fabricated using standard silicate glass (SG) and the vacuum bag technique. The dimensions were larger (i.e., 12"×12") to meet the formal impact tests standard. The tests were conducted by placing the sample on a concrete plate and using a ball of 75 mm in diameter and the height of impact 750 mm. A sample was considered to fail the test if the falling ball penetrated the specimen freely. The first glass pane from the impact side was bombarded, and the interlayer film needed to maintain integrity to a degree that the second glass pane was not penetrated, and thus the ball did not go through a particular sample. At least four sample specimens of five in each series of tests needed to pass for a positive result.

Typical results of the impact tests for various glass-polymer composite structures according to the current disclosure are summarized in the Table 6.

TABLE 6

Impact Test Results for Formulations/Structures According to Disclosure (examples 13-17).

| Ex. # | Polymer structure (mil) | Moisture absorption % | Haze % | Impact tests results number of specimens passing ball drop and canister bag tests out of 5 specimens |
|---|---|---|---|---|
| 13. | Comparison Sample PVB 0.38 mm (~15.2 mil) | 2.10 | 0.35 | 4 of 5 passed both tests |
| 14. | No EVA 2.5 mil-TPU 2.5 mil-Surlyn ™ 30 mil-TPU 2.5 mil | 0.65 | 0.55 | 4 of 5 passed ball; 4 of 5 passed c/bag |
| 15. | EVA 2.5 mil, TPU 1.5 mil-Surlyn ™ 35 mil-TPU 1.5 mil-EVA 2.5 mil | 0.30 | 0.35 | 5 of 5 passed ball; 4 of 5 passed c/bag |
| 16. | EVA 3 mil-TPU 2.5 mil-Surlyn ™ 30 mil-TPU 2.5 mil-EVA 3 mil | 0.16 | 0.45 | 5 of 5 passed ball; 5 of 5 passed c/bag |
| 17. | EVA 3 mil-TPU 5 mil-Surlyn ™ 30 mil-TPU 5 mil-EVA 3 mil | 0.21 | 0.50 | 5 of 5 passed ball; 5 of 5 passed c/bag |

In accordance with the above data, the preferred thickness of EVA skin layer within a glass composite construction in accordance with the embodiments is close to 2.5 mil and such a skin layer provides a good moisture barrier property of the interlayer. In addition, the preferred thickness of a TPU intermediate layer is 1.5-5 mil in order to provide good impact resistance and limiting the haze quality of the laminate. Finally, a sufficient thickness of the ionomer core layer is 30-40 mils for low haze and high strength and stiffness of the glass laminate.

All references, including publications, patent applications, and patents cited herein are hereby incorporated by reference in their entireties to the extent allowed as if each reference was individually and specifically indicated to be incorporated by reference and was set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein is merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

The embodiments and examples are thus illustrative of the invention rather than limiting of the invention. Revisions and modifications may be made to methods, materials, structures and dimensions for fabricating a multilayer interlayer polymer film and related glass composite in accordance with the embodiments while still providing a multilayer interlayer polymer film, related glass composite and method in accordance with the invention, further in accordance with the accompanying claims.

What is claimed is:

1. A multilayer polymer film interposed between a first glass layer and a second glass layer, the multilayer polymer film comprising:
   a core layer comprising an ionomer polymer material; and
   an intermediate layer on either side of the core layer and laminated to the core layer, wherein the intermediate layer comprises a thermoplastic polyurethane polymer material.

2. A multilayer polymer film interposed between a first glass layer and a second glass layer, the multilayer polymer film comprising:
   a core layer comprising either a thermoplastic polyurethane polymer material or an ionomer polymer material;
   an intermediate layer on either side of the core layer and laminated to the core layer, wherein the intermediate layer comprises the other of the thermoplastic polyurethane polymer material and the ionomer polymer material;
   a skin layer on either side of the intermediate layer and laminated to the at least one intermediate layer, wherein the skin layer comprises a non-ionomer polyolefin polymer material.

3. The multilayer polymer film of claim 2 wherein:
   the non-ionomer polyolefin polymer material comprises an ethylenevinylacetate polymer material having a vinyl acetate concentration from about 6 to about 21 percent;
   the ionomer polymer material has a melt flow rate from about 2 g/10 min to about 15 g/10 min; and
   the thermoplastic polyurethane polymer has a mechanical modulus from about 3.5 MPa to about 17000 MPa.

4. The multilayer polymer film of claim 3 wherein the ethylenevinylacetate polymer material is cross-linked.

5. The multilayer polymer film of claim 2 wherein the ionomer polymer material has a melt flow rate from about 1 g/10 min to about 15 g/10 min.

6. The multilayer polymer film of claim 2 wherein the thermoplastic polyurethane material has a melt flow rate from about 2 g/10 min to about 20 g/10 min.

7. The multilayer polymer film of claim 2 wherein a thickness ratio of the skin layer:intermediate layer:core layer is from about 1:3:6 to about 2:4:4.

8. The multilayer polymer film of claim 2 wherein a thickness of the core layer is from about 0.1 to about 10 mil.

9. The multilayer polymer film of claim 2 wherein the at least one of the core layer, the intermediate layer and the skin layer includes at least one additive.

10. The multilayer polymer film of claim 2 wherein at least one of the core layer, the intermediate layer and the skin layer further comprises a nanoparticulate material in a range from about 0.1 to about 10 weight percent.

11. The multilayer polymer film of claim 2 wherein the multilayer polymer film does not include a polyvinylbutyral polymer material layer.

12. A glass composite construction comprising:
   a multilayer polymer film located interposed between a first glass layer and a second glass layer, the multilayer polymer film comprising:
      a core layer comprising either a thermoplastic polyurethane polymer material or an ionomer polymer material;
      an intermediate layer on either side of the core layer, wherein the intermediate layer comprises the other of the thermoplastic polyurethane polymer material and the ionomer polymer material, and further wherein the intermediate layers comprise an internal side and an external side, the internal side of each intermediate layer laminated to the core layer; and
      a skin layer laminated to the external side of each intermediate layer, wherein each skin layer comprises a non-ionomer polyolefin polymer material.

13. The glass composite construction of claim 12 wherein:
   the non-ionomer polyolefin polymer material comprises an ethylenevinylacetate polymer material having a vinyl acetate concentration from about 6 to about 21 percent;
   the ionomer polymer material has a melt flow rate from about 2 g/10 min to about 15 g/10 min; and
   the thermoplastic polyurethane polymer has a mechanical modulus from about 3.5 MPa to about 17000 MPa.

14. The glass composite construction of claim 13 wherein:
   the ethylenevinylacetate polymer material is cross-linked;
   the ionomer polymer material has a melt flow rate from about 1 g/10 min to about 15 g/10 min; and
   the thermoplastic polyurethane material has a melt flow rate from about 2 g/10 min to about 20 g/10 min.

15. The glass composite construction of claim 12 wherein:
   a thickness ratio of the skin layer:intermediate layer:core layer is from about 1:3:6 to about 2:4:4; and
   a thickness of the core layer is from about 0.1 to about 10 mil.

16. The glass composite construction of claim 12 wherein the multilayer polymer film does not include a polyvinylbutyral polymer material layer.

17. A method for fabricating a multilayer polymer film comprising:
   assembling a stack comprising a first glass layer and a second glass layer having interposed therebetween:
      a core layer comprising either a thermoplastic polyurethane polymer material or an ionomer polymer material;
      an intermediate layer on either side of the core layer, wherein the intermediate layer comprises the other of the thermoplastic polyurethane polymer material and the ionomer polymer material, and further wherein the intermediate layers comprise an internal side and an external side, the internal side of each intermediate layer laminated to the core layer; and
      a skin layer laminated to the external side of each intermediate layer and comprising a non-ionomer polyolefin polymer material; and
   treating the stack to form a laminated glass composite construction.

18. The method of claim 17 wherein the treating includes a thermal treating.

19. The method of claim 17 wherein the treating includes a vacuum treating.

20. The method of claim 17 wherein the treating includes a thermal treating and a vacuum treating.

21. The method of claim 17 wherein the laminated glass composite construction comprises the core layer laminated to the at least one intermediate layer.

* * * * *